United States Patent
Talwar et al.

(10) Patent No.: US 9,202,465 B2
(45) Date of Patent: Dec. 1, 2015

(54) SPEECH RECOGNITION DEPENDENT ON TEXT MESSAGE CONTENT

(75) Inventors: Gaurav Talwar, Farmington Hills, MI (US); Xufang Zhao, Windsor (CA)

(73) Assignee: General Motors LLC, Detroit, MI (US)

( * ) Notice: Subject to any disclaimer, the term of this patent is extended or adjusted under 35 U.S.C. 154(b) by 893 days.

(21) Appl. No.: 13/072,003

(22) Filed: Mar. 25, 2011

(65) Prior Publication Data

US 2012/0245934 A1  Sep. 27, 2012

(51) Int. Cl.
*G10L 15/00* (2013.01)
*G10L 15/22* (2006.01)
*G10L 15/30* (2013.01)

(52) U.S. Cl.
CPC ............... *G10L 15/22* (2013.01); *G10L 15/30* (2013.01); *G10L 2015/227* (2013.01); *G10L 2015/228* (2013.01)

(58) Field of Classification Search
CPC ....... G10L 15/22; G10L 15/30; G10L 15/265; G10L 15/20; G10L 15/07
USPC ................................................. 704/231–257
See application file for complete search history.

(56) References Cited

U.S. PATENT DOCUMENTS

| | | | | |
|---|---|---|---|---|
| 5,231,670 A * | 7/1993 | Goldhor et al. | ............. | 704/275 |
| 5,233,681 A * | 8/1993 | Bahl et al. | ............. | 704/251 |
| 5,349,636 A * | 9/1994 | Irribarren | ............. | 379/88.15 |
| 5,406,618 A * | 4/1995 | Knuth et al. | ............. | 379/88.04 |
| 5,850,627 A * | 12/1998 | Gould et al. | ............. | 704/231 |
| 6,173,259 B1 * | 1/2001 | Bijl et al. | ............. | 704/235 |
| 6,308,151 B1 | 10/2001 | Smith | | |
| 6,430,531 B1 * | 8/2002 | Polish | ............. | 704/257 |
| 6,839,669 B1 * | 1/2005 | Gould et al. | ............. | 704/246 |
| 6,963,841 B2 * | 11/2005 | Handal et al. | ............. | 704/270 |
| 6,996,519 B2 * | 2/2006 | Franco et al. | ............. | 704/9 |
| 7,120,582 B1 * | 10/2006 | Young et al. | ............. | 704/255 |
| 7,137,126 B1 * | 11/2006 | Coffman et al. | ............. | 719/328 |
| 7,158,934 B2 * | 1/2007 | Honda et al. | ............. | 704/244 |
| 7,197,460 B1 * | 3/2007 | Gupta et al. | ............. | 704/270.1 |
| 7,216,079 B1 * | 5/2007 | Barnard et al. | ............. | 704/244 |
| 7,228,275 B1 * | 6/2007 | Endo et al. | ............. | 704/235 |
| 7,280,964 B2 * | 10/2007 | Wilson et al. | ............. | 704/251 |
| 7,310,601 B2 * | 12/2007 | Nishizaki et al. | ............. | 704/240 |
| RE41,080 E * | 1/2010 | Mahoney | ............. | 379/88.01 |
| 7,831,433 B1 * | 11/2010 | Belvin et al. | ............. | 704/275 |
| 7,899,669 B2 * | 3/2011 | Gadbois | ............. | 704/235 |
| 7,925,506 B2 * | 4/2011 | Farmaner et al. | ............. | 704/257 |
| 7,949,529 B2 * | 5/2011 | Weider et al. | ............. | 704/270 |
| 7,983,910 B2 * | 7/2011 | Subramanian et al. | ............. | 704/250 |
| 8,005,680 B2 * | 8/2011 | Kommer | ............. | 704/275 |
| 8,108,212 B2 * | 1/2012 | Maegawa | ............. | 704/235 |
| 8,126,712 B2 * | 2/2012 | Mukaigaito et al. | ............. | 704/251 |
| 8,219,384 B2 * | 7/2012 | Lloyd et al. | ............. | 704/8 |
| 8,583,436 B2 * | 11/2013 | Yamamoto et al. | ............. | 704/257 |

(Continued)

*Primary Examiner* — Pierre-Louis Desir
*Assistant Examiner* — Fariba Sirjani
(74) *Attorney, Agent, or Firm* — Anthony Luke Simon; Reising Ethington P.C.

(57) ABSTRACT

A method of automatic speech recognition. An utterance is received from a user in reply to a text message, via a microphone that converts the reply utterance into a speech signal. The speech signal is processed using at least one processor to extract acoustic data from the speech signal. An acoustic model is identified from a plurality of acoustic models to decode the acoustic data, and using a conversational context associated with the text message. The acoustic data is decoded using the identified acoustic model to produce a plurality of hypotheses for the reply utterance.

2 Claims, 4 Drawing Sheets

(56) References Cited

U.S. PATENT DOCUMENTS

| | | |
|---|---|---|
| 8,756,062 B2 * | 6/2014 | Talwar et al. ............. 704/256.2 |
| 8,762,151 B2 * | 6/2014 | Correia et al. ............... 704/253 |
| 2003/0050778 A1 * | 3/2003 | Nguyen et al. ............... 704/235 |
| 2003/0182131 A1 * | 9/2003 | Arnold et al. ................ 704/275 |
| 2003/0191639 A1 * | 10/2003 | Mazza ......................... 704/231 |
| 2004/0230434 A1 * | 11/2004 | Galanes et al. ............ 704/270.1 |
| 2005/0033582 A1 * | 2/2005 | Gadd et al. .................. 704/277 |
| 2005/0182628 A1 * | 8/2005 | Choi ............................ 704/252 |
| 2007/0100618 A1 * | 5/2007 | Lee et al. ..................... 704/238 |
| 2007/0112567 A1 * | 5/2007 | Lau et al. ..................... 704/240 |
| 2007/0124134 A1 | 5/2007 | Van Kommer |
| 2007/0294084 A1 * | 12/2007 | Cross et al. .................. 704/251 |
| 2008/0004880 A1 * | 1/2008 | Acero et al. ............... 704/270.1 |
| 2009/0253463 A1 * | 10/2009 | Shin et al. .................... 455/563 |
| 2010/0009720 A1 * | 1/2010 | Cha et al. ..................... 455/566 |
| 2010/0036660 A1 * | 2/2010 | Bennett ........................ 704/231 |
| 2012/0016671 A1 * | 1/2012 | Jaggi et al. ................... 704/235 |
| 2012/0059652 A1 * | 3/2012 | Adams et al. ................ 704/235 |
| 2012/0209594 A1 * | 8/2012 | Agarwal et al. ................. 704/9 |
| 2012/0245934 A1 * | 9/2012 | Talwar et al. ................ 704/235 |
| 2012/0310645 A1 * | 12/2012 | Gruenstein et al. .......... 704/235 |
| 2013/0006620 A1 * | 1/2013 | Maes et al. ................... 704/231 |
| 2013/0073294 A1 * | 3/2013 | Burns et al. .................. 704/275 |
| 2013/0117022 A1 * | 5/2013 | Chen et al. ................... 704/235 |
| 2013/0138428 A1 * | 5/2013 | Chandramouli et al. ......... 704/9 |

* cited by examiner

SPEECH RECOGNITION DEPENDENT ON TEXT MESSAGE CONTENT

TECHNICAL FIELD

The present invention relates generally to speech signal processing.

BACKGROUND OF THE INVENTION

In general, speech signal processing involves processing electrical and/or electronic signals for recognition or synthesis of speech. Speech synthesis is the production of speech from text by artificial means, and text-to-speech (TTS) systems provide an alternative to conventional computer-to-human visual output devices like computer monitors or displays. Conversely, automatic speech recognition (ASR) technologies enable microphone-equipped computing devices to interpret speech and thereby provide an alternative to conventional human-to-computer tactile input devices such as keyboards or keypads.

In some environments, TTS and ASR technologies are combined to provide a user with hands-free audible interaction with a system. For example, a telematics system in a vehicle may receive text messages, use TTS technology to present them in audible form for a driver, receive a verbal reply from the driver, and relay the reply to a server which recognizes the reply and generates and transmits a corresponding text message response. Speech recognition is normally difficult task, but especially so when dealing with strange abbreviations and other colloquial peculiarities of modern day text messaging.

SUMMARY OF THE INVENTION

According to one embodiment of the invention, there is provided a method of automatic speech recognition, including the following steps:
  a) receiving from a user, an utterance in reply to a text message via a microphone that converts the reply utterance into a speech signal;
  b) pre-processing the speech signal using at least one processor to extract acoustic data from the speech signal;
  c) identifying an acoustic model of a plurality of acoustic models to decode the acoustic data, using a conversational context associated with the text message; and
  d) decoding the acoustic data using the identified acoustic model to produce a plurality of hypotheses for the reply utterance.

According to another embodiment of the invention, there is provided a method of automatic speech recognition, including the following steps:
  a) receiving a text message at a speech recognition client device;
  b) processing the text message with conversational context-specific language models stored on the client device using at least one processor of the client device to identify a conversational context corresponding to the text message;
  c) synthesizing speech from the text message;
  d) communicating the synthesized speech via a loudspeaker of the client device to a user of the client device;
  e) receiving a reply utterance from the user via a microphone of the client device that converts the reply utterance into a speech signal;
  f) pre-processing the speech signal using the at least one processor to extract acoustic data from the received speech signal;
  g) communicating the extracted acoustic data and the identified conversational context to a speech recognition server;
  h) identifying an acoustic model of a plurality of acoustic models stored at the server to decode the acoustic data, using the identified conversational context;
  i) decoding the acoustic data using the identified acoustic model to produce a plurality of hypotheses for the reply utterance; and
  j) post-processing the plurality of hypotheses to identify one of the hypotheses as the reply utterance.

According to a further embodiment of the invention, there is provided a method of automatic speech recognition, including the following steps:
  a) receiving a text message at a speech recognition client device;
  b) processing the text message with conversational context-specific language models stored on the client device using at least one processor of the client device to identify a conversational context corresponding to the text message;
  c) synthesizing speech from the text message;
  d) communicating the synthesized speech via a loudspeaker of the client device to a user of the client device;
  e) receiving a reply utterance from a user via a microphone of the client device that converts the reply utterance into a speech signal;
  f) pre-processing the speech signal using the at least one processor to extract acoustic data from the received speech signal;
  g) identifying an acoustic model of a plurality of acoustic models to decode the acoustic data, using the identified conversational context associated with the text message;
  h) decoding the acoustic data using the identified acoustic model to produce a plurality of hypotheses for the reply utterance;
  i) determining whether a confidence value associated with at least one of the plurality of hypotheses for the reply utterance is greater than a confidence threshold;
  j) communicating the extracted acoustic data and the conversational context to a speech recognition server, if the confidence value is determined to be less than the confidence threshold, otherwise post-processing the plurality of hypotheses to identify one of the hypotheses as the reply utterance, and outputting from the client device the identified hypothesis as at least part of a reply text message;
  h) identifying at the server, an acoustic model of a plurality of acoustic models stored at the server to decode the acoustic data, using the identified conversational context;
  i) decoding the acoustic data using the acoustic model identified at the server to produce a plurality of hypotheses for the reply utterance;
  j) post-processing the plurality of hypotheses to identify one of the hypotheses as the reply utterance; and
  k) outputting from the server the identified hypothesis as at least part of a reply text message.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The following description describes an example communications system, example TTS and ASR systems that can be used with the communications system, and one or more example methods that can be used with the aforementioned systems. The methods described below can be used by a vehicle telematics unit (VTU) as a part of recognizing speech uttered by a user of the VTU. Although the methods described below are such as they might be implemented for a VTU, it will be appreciated that they could be useful in any type of vehicle speech recognition system and other types of speech recognition systems. For example, the methods can be implemented in ASR-enabled mobile computing devices or systems, personal computers, or the like.

Communications System

Figure 1:
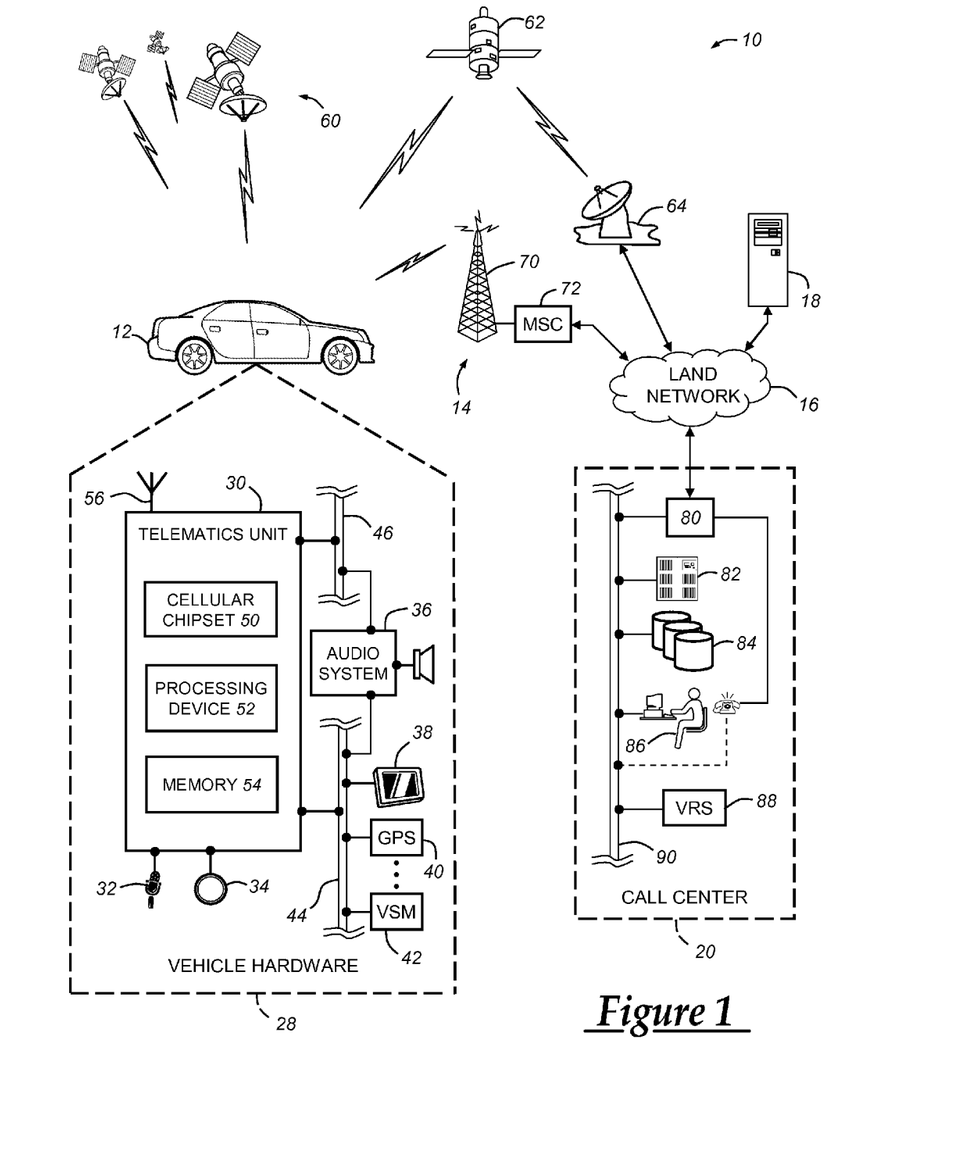
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/ or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Speech Synthesis System

Figure 2:
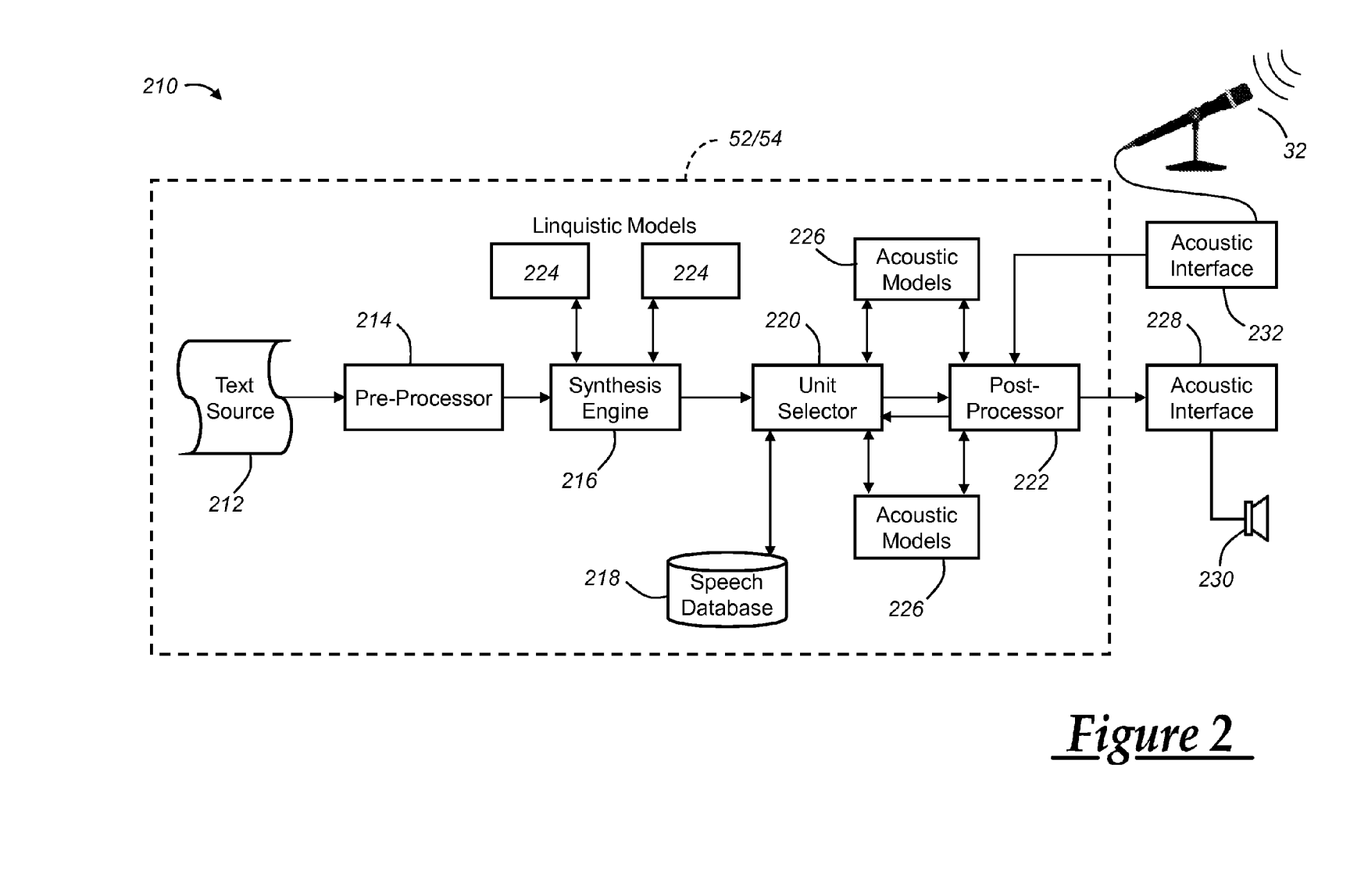
FIG. 2 is a block diagram illustrating an exemplary embodiment of a text-to-speech (TTS) system that can be used with the system of FIG. 1 and for implementing exemplary methods of speech synthesis and/or improving speech recognition.

Turning now to FIG. 2, there is shown an exemplary architecture for a text-to-speech (TTS) system 210 that can be used to enable the presently disclosed method. In general, a user or vehicle occupant may interact with a TTS system to receive instructions from or listen to menu prompts of an application, for example, a vehicle navigation application, a hands free calling application, or the like. Generally, a TTS system extracts output words or identifiers from a source of text, converts the output into appropriate language units, selects stored units of speech that best correspond to the language units, converts the selected units of speech into audio signals, and outputs the audio signals as audible speech for interfacing with a user.

TTS systems are generally known to those skilled in the art, as described in the background section. But FIG. 2 illustrates an example of an improved TTS system according to the present disclosure. According to one embodiment, some or all of the system 210 can be resident on, and processed using, the telematics unit 30 of FIG. 1. According to an alternative exemplary embodiment, some or all of the TTS system 210 can be resident on, and processed using, computing equipment in a location remote from the vehicle 12, for example, the call center 20. For instance, linguistic models, acoustic models, and the like can be stored in memory of one of the servers 82 and/or databases 84 in the call center 20 and communicated to the vehicle telematics unit 30 for in-vehicle TTS processing. Similarly, TTS software can be processed using processors of one of the servers 82 in the call center 20. In other words, the TTS system 210 can be resident in the telematics unit 30 or distributed across the call center 20 and the vehicle 12 in any desired manner.

The system 210 can include one or more text sources 212, and a memory, for example the telematics memory 54, for storing text from the text source 212 and storing TTS software and data. The system 210 can also include a processor, for example the telematics processor 52, to process the text and function in conjunction with the memory and in conjunction with the following system modules. A pre-processor 214 receives text from the text source 212 and converts the text into suitable words or the like. A synthesis engine 216 converts the output from the pre-processor 214 into appropriate language units like phrases, clauses, and/or sentences. One or more speech databases 218 store recorded speech. A unit selector 220 selects units of stored speech from the database 218 that best correspond to the output from the synthesis engine 216. A post-processor 222 modifies or adapts one or more of the selected units of stored speech. One or more or linguistic models 224 are used as input to the synthesis engine 216, and one or more acoustic models 226 are used as input to the unit selector 220. The system 210 also can include an acoustic interface 228 to convert the selected units of speech into audio signals and a loudspeaker 230, for example of the telematics audio system, to convert the audio signals to audible speech. The system 210 further can include a microphone, for example the telematics microphone 32, and an acoustic interface 232 to digitize speech into acoustic data for use as feedback to the post-processor 222.

The text source 212 can be in any suitable medium and can include any suitable content. For example, the text source 212 can be one or more scanned documents, text files or application data files, or any other suitable computer files, or the like. The text source 212 can include words, numbers, symbols, and/or punctuation to be synthesized into speech and for output to the text converter 214. Any suitable quantity and type of text sources can be used.

The pre-processor 214 converts the text from the text source 212 into words, identifiers, or the like. For example, where text is in numeric format, the pre-processor 214 can convert the numerals to corresponding words. In another example, where the text is punctuation, emphasized with caps or other special characters like umlauts to indicate appropriate stress and intonation, underlining, or bolding, the pre-processor 214 can convert same into output suitable for use by the synthesis engine 216 and/or unit selector 220.

The synthesis engine 216 receives the output from the text converter 214 and can arrange the output into language units that may include one or more sentences, clauses, phrases, words, subwords, and/or the like. The engine 216 may use the linguistic models 224 for assistance with coordination of most likely arrangements of the language units. The linguistic models 224 provide rules, syntax, and/or semantics in arranging the output from the text converter 214 into language units. The models 224 can also define a universe of language units the system 210 expects at any given time in any given TTS mode, and/or can provide rules, etc., governing which types of language units and/or prosody can logically follow other types of language units and/or prosody to form natural sounding speech. The language units can be comprised of phonetic equivalents, like strings of phonemes or the like, and can be in the form of phoneme HMM's.

The speech database 218 includes pre-recorded speech from one or more people. The speech can include pre-recorded sentences, clauses, phrases, words, subwords of pre-recorded words, and the like. The speech database 218 can also include data associated with the pre-recorded speech, for example, metadata to identify recorded speech segments for use by the unit selector 220. Any suitable type and quantity of speech databases can be used.

The unit selector 220 compares output from the synthesis engine 216 to stored speech data and selects stored speech that best corresponds to the synthesis engine output. The speech selected by the unit selector 220 can include pre-recorded sentences, clauses, phrases, words, subwords of pre-recorded words, and/or the like. The selector 220 may use the acoustic models 226 for assistance with comparison and selection of most likely or best corresponding candidates of stored speech. The acoustic models 226 may be used in conjunction with the selector 220 to compare and contrast data of the synthesis engine output and the stored speech data, assess the magnitude of the differences or similarities therebetween, and ultimately use decision logic to identify best matching stored speech data and output corresponding recorded speech.

In general, the best matching speech data is that which has a minimum dissimilarity to, or highest probability of being, the output of the synthesis engine 216 as determined by any of various techniques known to those skilled in the art. Such techniques can include dynamic time-warping classifiers, artificial intelligence techniques, neural networks, free phoneme recognizers, and/or probabilistic pattern matchers such as Hidden Markov Model (HMM) engines. HMM engines are known to those skilled in the art for producing multiple TTS model candidates or hypotheses. The hypotheses are considered in ultimately identifying and selecting that stored speech data which represents the most probable correct interpretation of the synthesis engine output via acoustic feature analysis of the speech. More specifically, an HMM engine generates statistical models in the form of an "N-best" list of language unit hypotheses ranked according to HMM-calculated confidence values or probabilities of an observed sequence of acoustic data given one or another language units, for example, by the application of Bayes' Theorem.

In one embodiment, output from the unit selector 220 can be passed directly to the acoustic interface 228 or through the post-processor 222 without post-processing. In another embodiment, the post-processor 222 may receive the output from the unit selector 220 for further processing.

In either case, the acoustic interface 228 converts digital audio data into analog audio signals. The interface 228 can be a digital to analog conversion device, circuitry, and/or software, or the like. The loudspeaker 230 is an electroacoustic transducer that converts the analog audio signals into speech audible to a user and receivable by the microphone 32.

Automatic Speech Recognition System

Figure 3:
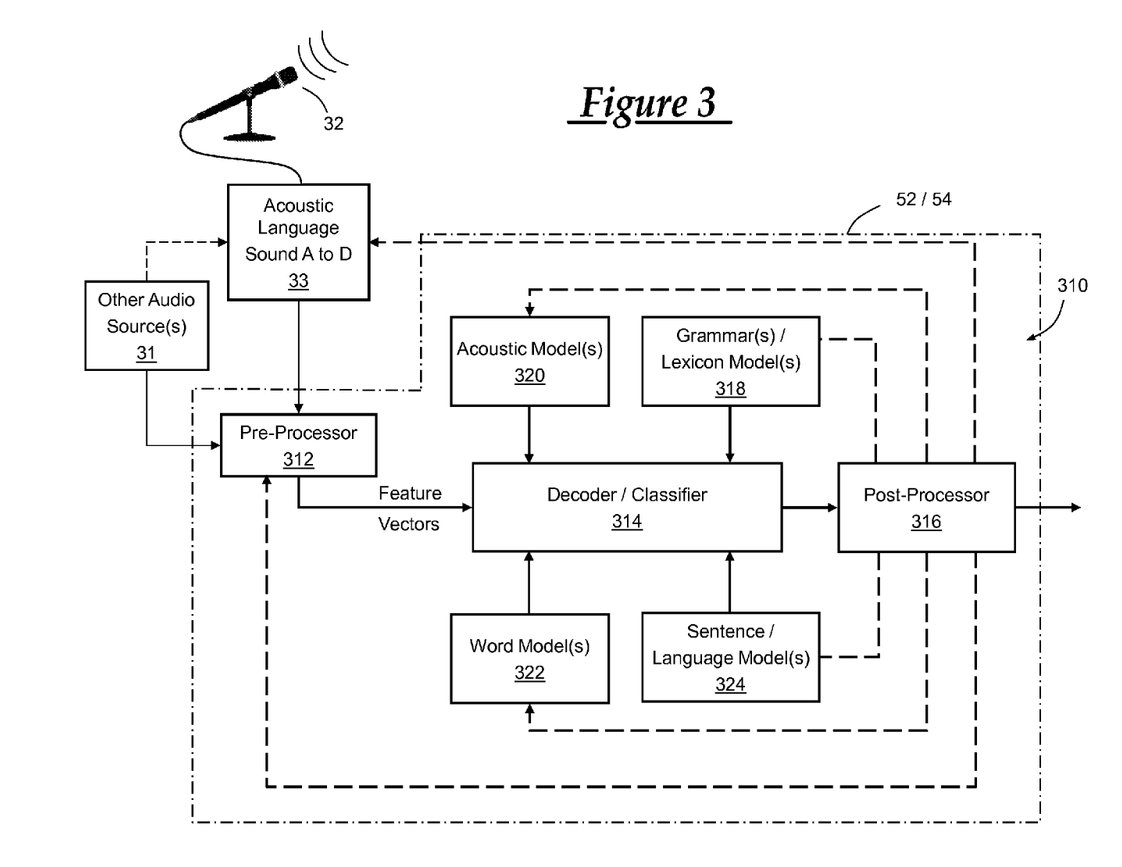
FIG. 3 is a block diagram illustrating an exemplary embodiment of an automatic speech recognition (ASR) system that can be used with the communications system of FIG. 1 and the TTS system of FIG. 2, and for implementing exemplary methods of speech recognition and/or improving speech synthesis.

Turning now to FIG. 3, there is shown an exemplary architecture for an ASR system 310 that can be used to enable the presently disclosed method. In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 3 illustrates just one specific exemplary ASR system 310. Although shown and described as being embedded in the vehicle telematics unit 30, those of ordinary skill in the art will recognized that a similar system may be deployed at the call center, or distributed between the vehicle and call center. The system 310 includes a device to receive speech such as the telematics microphone 32, and an acoustic interface 33 such as a sound card of the telematics unit 30 having an analog to digital converter to digitize the speech into acoustic data. The system 310 also includes a memory such as the telematics memory 54 for storing the acoustic data and storing speech recognition software and databases, and a processor such as the telematics processor 52 to process the acoustic data. The processor functions with the memory and in conjunction with the following modules: one or more front-end processors, pre-processors, or pre-processor software modules 312 for parsing streams of the acoustic data of the speech into parametric representations such as acoustic features; one or more decoders or decoder software modules 314 for decoding the acoustic features to yield digital subword or word output data corresponding to the input speech utterances; and one or more back-end processors, post-processors, or post-processor software modules 316 for using the output data from the decoder module(s) 314 for any suitable purpose.

The system 310 can also receive speech from any other suitable audio source(s) 31, which can be directly communicated with the pre-processor software module(s) 312 as shown in solid line or indirectly communicated therewith via the acoustic interface 33. The audio source(s) 31 can include, for example, a telephonic source of audio such as a voice mail system, or other telephonic services of any kind.

One or more modules or models can be used as input to the decoder module(s) 314. First, grammar and/or lexicon model(s) 318 can provide rules governing which words can logically follow other words to form valid sentences. In a broad sense, a lexicon or grammar can define a universe of vocabulary the system 310 expects at any given time in any given ASR mode. For example, if the system 310 is in a training mode for training commands, then the lexicon or grammar model(s) 318 can include all commands known to and used by the system 310. In another example, if the system 310 is in a main menu mode, then the active lexicon or grammar model(s) 318 can include all main menu commands expected by the system 310 such as call, dial, exit, delete, directory, or the like. Second, acoustic model(s) 320 assist with selection of most likely subwords or words corresponding to input from the pre-processor module(s) 312. Third, word model(s) 322 and sentence/language model(s) 324 provide rules, syntax, and/or semantics in placing the selected subwords or words into word or sentence context. Also, the sentence/language model(s) 324 can define a universe of sentences the system 310 expects at any given time in any given ASR mode, and/or can provide rules, etc., governing which sentences can logically follow other sentences to form valid extended speech.

According to an alternative exemplary embodiment, some or all of the ASR system 310 can be resident on, and processed using, computing equipment in a location remote from the vehicle 12 such as the call center 20. For example, grammar models, acoustic models, and the like can be stored in memory of one of the servers 82 and/or databases 84 in the call center 20 and communicated to the vehicle telematics unit 30 for in-vehicle speech processing. Similarly, speech recognition software can be processed using processors of one of the servers 82 in the call center 20. In other words, the ASR system 310 can be resident in the telematics unit 30 or distributed across the call center 20 and the vehicle 12 in any desired manner.

First, acoustic data is extracted from human speech wherein a vehicle occupant speaks into the microphone 32, which converts the utterances into electrical signals and communicates such signals to the acoustic interface 33. A sound-responsive element in the microphone 32 captures the occupant's speech utterances as variations in air pressure and converts the utterances into corresponding variations of analog electrical signals such as direct current or voltage. The acoustic interface 33 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 33 converts the analog electrical signals into digital electronic signals. The digital data are binary bits which are buffered in the telematics memory 54 and then processed by the telematics processor 52 or can be processed as they are initially received by the processor 52 in real-time.

Second, the pre-processor module(s) 312 transforms the continuous stream of digital speech data into discrete sequences of acoustic parameters. More specifically, the processor 52 executes the pre-processor module(s) 312 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module(s) 312 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module(s) 314 to process the incoming feature vectors of each test pattern. The decoder module(s) 314 is also known as a recognition engine or classifier, and uses stored known reference patterns of speech. Like the test patterns, the reference patterns are defined as a concatenation of related acoustic frames and corresponding parameters. The decoder module(s) 314 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest.

In a similar manner, individual HMMs for a sequence of subwords can be concatenated to establish single or multiple word HMM. Thereafter, an N-best list of single or multiple word reference patterns and associated parameter values may be generated and further evaluated.

In one example, the speech recognition decoder 314 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 322 and to construct sentences with the input from the language models 324.

Finally, the post-processor software module(s) 316 receives the output data from the decoder module(s) 314 for any suitable purpose. In one example, the post-processor software module(s) 316 can identify or select one of the reference patterns from the N-best list of single or multiple word reference patterns as recognized speech. In another example, the post-processor module(s) 316 can be used to convert acoustic data into text or digits for use with other aspects of the ASR system or other vehicle systems. In a further example, the post-processor module(s) 316 can be used to provide training feedback to the decoder 314 or pre-processor 312. More specifically, the post-processor 316 can be used to train acoustic models for the decoder module(s) 314, or to train adaptation parameters for the pre-processor module(s) 312.

Methods

Figure 4:
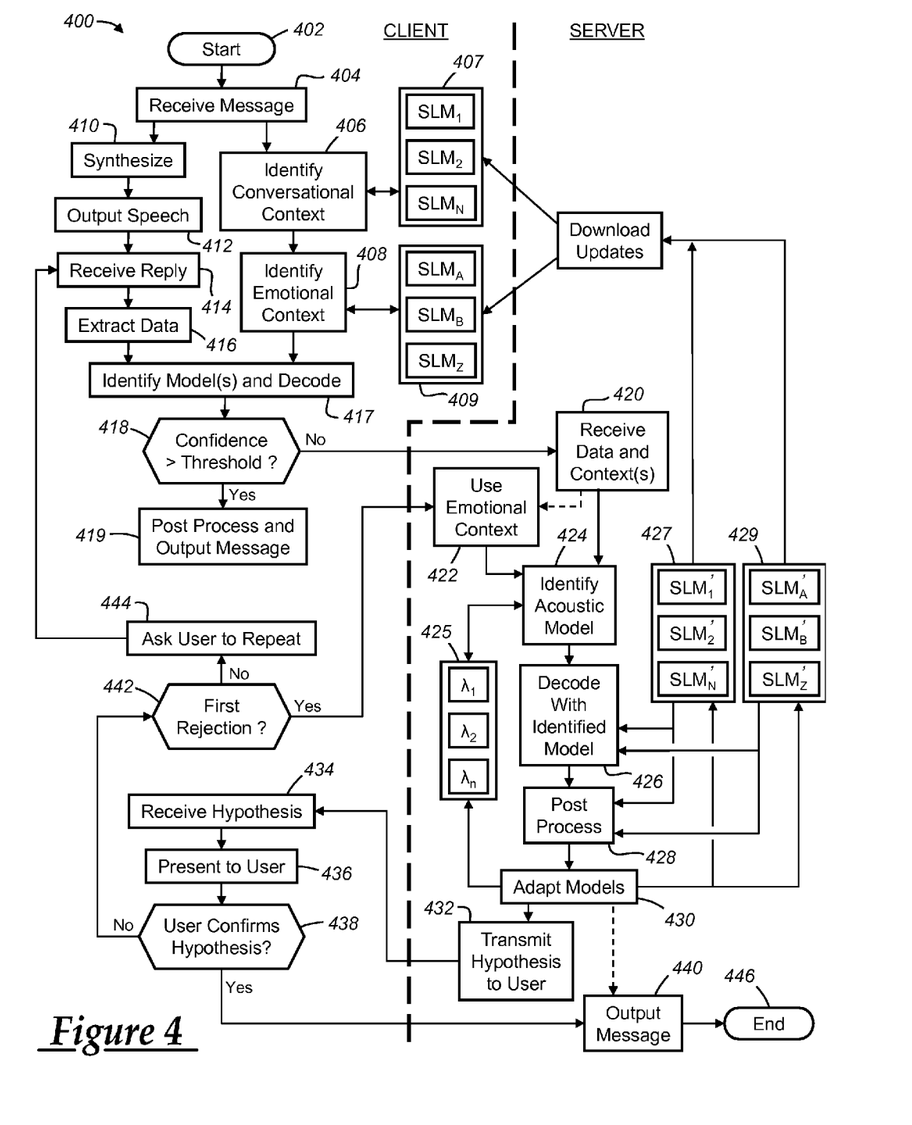
FIG. 4 is a flow chart illustrating an exemplary embodiment of a method of automatic speech recognition that can be carried out by the communication system of FIG. 1, and the TTS and ASR systems of FIGS. 2 and 3.

Turning now to FIG. 4, there is shown an automatic speech recognition method 400 that can be carried out using suitable programming of the TTS system 210 of FIG. 2 and/or the ASR system 310 of FIG. 32 within the operating environment of the vehicle telematics unit 30 as well as using suitable hardware and programming of the other components shown in FIG. 1. For example, speech recognition hardware, firmware, and software can resident on the computer 18 and/or on one of the servers 82 in the call center 20. In other words, the ASR system 310 can be resident in the telematics unit 30 or distributed across the vehicle 12 and the computer 18 and/or call center 20 in any desired manner.

Such programming and use of the hardware described above will be apparent to those skilled in the art based on the above system description and the discussion of the method described below in conjunction with the remaining figures. Those skilled in the art will also recognize that the methods can be carried out using other ASR systems within other operating environments. The method steps may or may not be sequentially processed, and the invention(s) may encompass any sequencing, overlap, or parallel processing of such steps.

In general, a speech signal processing method 400 improves automatic speech recognition according to the following steps: receiving from a user an utterance in reply to a text message via a microphone that converts the reply utterance into a speech signal; pre-processing the speech signal using at least one processor to extract acoustic data from the received speech signal; identifying an acoustic model of a plurality of acoustic models to decode the acoustic data, using a conversational context associated with the text message; and decoding the acoustic data using the identified acoustic model to produce a plurality of hypotheses for the reply utterance.

More specifically, with specific reference to FIG. 4 and with occasional reference FIGS. 1-3, the method 400 begins in any suitable manner at step 402. For example, a vehicle user starts interaction with the user interface of the telematics unit 30, preferably by depressing the user interface pushbutton 34 to begin a session in which the user inputs voice commands that are interpreted by the telematics unit 30 while operating in speech recognition mode. Using the audio system 36, the telematics unit 30 can acknowledge the pushbutton activation by playing a sound or providing a verbal request for a command from the user or occupant.

At step 404, a text message is received. For example, a text message may be received at the telematics unit 30 via the communications system. The text message may be a short message service (SMS) type of message, extended messaging service, mobile instant messaging, and/or any other suitable type of messaging service and using standard mail protocols such as SMTP over TCP/IP, session initiation protocol, proprietary protocols, and/or any other suitable protocol(s).

At step 406, a text message is processed with conversational context-specific language models 407 to identify a conversational context corresponding to the text message. For example, the text message from step 404 can be processed with the language models stored on a client device, for instance, the telematics unit 30, and using at least one processor of the client device, for instance, the processor 52. Also, the conversational context can include "humor" for a humorous conversation, or "dinner" for a conversation about dinner plans, or "romantic" for an amorous conversation, or "gossip" for gossipy chat, or "invitation" for invitations and related responses, or "greetings" for introductory types of conversations. The conversational context can include one or more of any of the aforementioned examples, and/or any other suitable types of conversational contexts. In one embodiment, each of the language models 407 corresponds to one conversational context, and can be developed and trained in any suitable manner by a plurality of speakers before speech recognition runtime. In another embodiment, any novel text input may be used to update the statistical language models in any suitable manner if the models did not encounter the text in the initial training corpus.

At step 408, a text message also can be processed with emotional context-specific language models 409 to identify an emotional context corresponding to the text message. For example, the text message from step 406 can be processed with language models stored on client device, for instance, the telematics unit 30, and using at least one processor of the client device, for instance, the processor 52. Also, the emotional context can include "anger" for hostile conversation, or "happy" for upbeat conversation, or "sad" for unhappy conversations, or "confused" or the like. The emotional context can include one or more of any of the aforementioned examples, and/or any other suitable types of emotional contexts. In one embodiment, each of the language models 409 corresponds to one emotional context, and can be developed and trained in any suitable manner by a plurality of speakers before speech recognition runtime. In addition, the emotional context can be used to generate an appropriate TTS rendering, for example, to audibly convey the emotional context to the user/listener.

At step 410, speech is synthesized from a text message. For example, the text message from steps 406 and/or 408 is pre-processed to convert the text into output suitable for speech synthesis. More specifically, the TTS pre-processor 214 can convert the text message into words, identifiers, or the like for use by the TTS synthesis engine 216. Then, such output can be arranged into language units. For example, the TTS synthesis engine 216 can receive the output from the text converter 214 and, with the linguistic models 224, can arrange the output into language units that may include one or more sentences, clauses, phrases, words, subwords, and/or the like. The language units can be comprised of phonetic equivalents, like strings of phonemes or the like. Thereafter, language units can be compared to stored data of speech, and the speech that best corresponds to the language units is selected as speech representative of the text message. For example, the unit selector 220 can use the TTS acoustic models 228 to compare the language units output from the synthesis engine 216 to speech data stored in the first speech database 218 and select stored speech having associated data that best corresponds to the synthesis engine output.

At step 412, the synthesized speech is communicated to a user. For example, the pre-recorded speech selected from the database 218 by the selector 220 can be output through the interface 228 and speaker 230 of the telematics unit 30.

At step 414, a speech reply is received from a user. For example, an utterance may be received from a user via a microphone that converts the utterance into a speech signal. More specifically, the telematics microphone 32 may be used to convert user speech utterances into electrical signals for communication to the acoustic interface 33, which may digitize the speech into acoustic data.

At step 416, a speech signal is pre-processed and acoustic data extracted from the speech signal. For example, the speech signal may be pre-processed using the ASR pre-processor 312, or any other suitable telecommunications pre-processor or processing device of any kind. The speech signal may be parsed by the pre-processor into streams of parametric representations such as acoustic features or acoustic feature vectors, or the like. For example, the acoustic data from the acoustic interface 33 can be pre-processed by the pre-processor module(s) 312 of the ASR system 310 as described above.

At step 417, an acoustic model of a plurality of acoustic models stored at the client device is identified using the identified conversational context for downstream decoding of the acoustic data. In a first embodiment, only the conversational context is used. In as second embodiment, the emotional context also may be used. In the first embodiment, each of the acoustic models can be specific to one of the conversational contexts. In the second embodiment, the plurality of models can include a permutation matrix of conversational/emotional models. For instance, the models can include a "din-ner"/"happy" acoustic model, a "dinner"/"angry" acoustic model, a "gossip"/"confused" acoustic model, and the like.

Also at step 417, the generated acoustic feature vectors are decoded with the identified model(s) to produce a plurality of hypotheses for the received speech. For example, the plurality of hypotheses may be an N-best list of hypotheses, and the decoder module(s) 314 of the ASR system 310 can be used to decode the acoustic feature vectors. Conversational and/or emotional context-specific statistical language models 407, 409 can be used to assist with decoding in any suitable manner.

At step 418, it is determined whether a confidence value associated with at least one of the plurality of hypotheses for the reply utterance is greater than a confidence threshold. Confidence values and calculations are well known to those of ordinary skill in the art and can be calculated in any suitable manner, including using supervised learning techniques, neural networks, or the like. The particular threshold value can be empirically determined for any given application and, thus, can be any value appropriate for a given environment and circumstances. An example confidence threshold can be, for example, a 75% confidence level. More specifically, an acceptable confidence threshold value can be set and if a confidence score associated with one or more of the hypotheses is less than the threshold value, then the extracted acoustic data from step 416 and the conversational context(s) from steps 406 and/or 408 may be communicated to the speech recognition server and received thereby at step 420. Otherwise, the method may proceed to step 419.

At step 419, the plurality of hypotheses can be post-processed to identify one of the hypotheses as the reply utterance, and the identified hypothesis can be output directly from the client device as at least part of a reply text message, using any suitable text messaging technique(s) and protocol(s). For example, the ASR post-processor 216 may include any suitable device or module to compose the text message. Also the post-processor may, via cooperation with the telematics unit 30, output the text message directly via cellular communication, or may output the text message indirectly, for example, via a Bluetooth connection to a user telephone or the like, which, in turn, may output the text message via cellular communication.

In another embodiment, steps 417-419 may be omitted, wherein the acoustic data from the speech signal from step 416 and the context(s) identified in steps 406 and/or 408 may be transmitted directly to the speech recognition server. Such data can be packetized in any suitable manner and sent via a data connection, for instance, via packet data transmission over a data channel like a private or public packet-switched network (PSN), or via data over cellular voice channel using the modems carried onboard the vehicle 12 and in the call center 20 and/or computer 18, or in any other suitable manner. Where modem communication over a voice channel is used, the data can be sent from the vehicle 12 using any suitable vocoder that can be included in the cellular chipset 50.

At step 420, the acoustic data transmitted is received at the server 18 and/or 82. For example, the data can be received via packet data transmission, via data over voice protocol, and/or via any other suitable manner. The data can be saved in any suitable location.

At step 422, a determination is made whether to use emotional context in a downstream step of identifying a corresponding acoustic model. In the illustrated embodiment, for example, if the acoustic data is being processed at the server 18 and/or 82 for the first time, then the emotional context can be omitted. In another embodiment, however, the emotional context may be used to supplement the conversational context from the outset.

At step 424, an acoustic model of a plurality of acoustic models 425 stored at the server 18 and/or 82 are identified using the conversational context for downstream decoding of the acoustic data. In a first embodiment, only the conversational context is used. In as second embodiment, the emotional context also may be used. In the first embodiment, each of the acoustic models 425 can be specific to one of the conversational contexts. In the second embodiment, the plurality of models 425 can include a permutation matrix of conversational/emotional models. For instance, the models can include a "dinner"/"happy" acoustic model, a "dinner"/"angry" acoustic model, a "gossip"/"confused" acoustic model, and the like.

At step 426, the generated acoustic feature vectors are decoded with the identified model to produce a plurality of hypotheses for the received speech. For example, the plurality of hypotheses may be an N-best list of hypotheses, and the decoder module(s) 314 of the ASR system 310 can be used to decode the acoustic feature vectors. Conversational and/or emotional context-specific statistical language models 427, 429 can be used to assist with decoding in any suitable manner.

At step 428, the plurality of hypotheses can be post-processed to identify one of the hypotheses as the reply utterance. For example, the post-processor 316 of the ASR system 310 can post-process the hypotheses from step 426 with confidence thresholds or the like, to identify one of the plurality of hypotheses as the received speech. Conversational and/or emotional context-specific statistical language models 427, 429 can be used to assist with decoding in any suitable manner. The post-processor 316 also may be used to generate textual data corresponding to the recognized speech.

At step 430, one or more models can be adapted in response to the identified speech from step 428. For example, the acoustic models 425 and/or the statistical language models 427, 429 can be adapted or trained so that the models reflect the latest or recently received text messaging abbreviations and patterns so that text message replies can be more accurately recognized. Acoustic model adaptation and training is well known to those of ordinary skill in the art and any suitable technique(s) may be used. This step also can include communicating the plurality of context-specific language models 427, 429 from the server to the client device to update the language models 407, 409 stored on the client device for improved text message context classification over time.

In one embodiment, the process may proceed directly to step 440, to output or transmit the textual data corresponding to the recognized speech. In another embodiment, the process proceeds to step 432 for user confirmation and/or re-entry.

At steps 432 and 434, the hypothesis from step 428 can be transmitted to and received by the vehicle 12. For example, data for or associated with the hypothesis can be sent via a packet data connection, data over cellular voice channel, or in any other suitable manner, and received by the telematics unit 30 and stored thereon in any suitable memory. In one embodiment, the hypothesis is in a textual data format. In another embodiment, the hypothesis is acoustical data that may be in a sound file format.

At step 436, the hypothesis for the user's reply to the text message can be presented to the user in any suitable manner. For example, the hypothesis can be presented in a visual textual manner via a display screen of the telematics unit user interface, and/or in an audible manner via the loudspeaker of the telematics unit user interface.

At step 438, a determination is made whether the user confirms the hypothesis as the user's intended reply to the text message. If the user confirms, then the process proceeds to step 440, but if the user rejects the hypothesis, then the method proceeds to step 442.

At step 440, the textual data corresponding to the recognized speech is output or transmitted as a reply text message, using any suitable text messaging technique(s) and protocol(s). This step can be triggered by transmission from the vehicle 12 and receipt by the server 18 and/or 82 of any suitable instruction(s) communicated in any suitable manner.

At step 442, a determination is made as to whether the user's rejection at step 438 was the first for the reply being analyzed currently. If so, then the method may loop back to step 422, whereafter emotional context may be used, particularly if it was not used previously to analyzed the current reply. This step can be triggered by transmission from the vehicle 12 and receipt by the server 18 and/or 82 of any suitable instruction(s) communicated in any suitable manner. If not, however, then the method may proceed to step 444.

At step 444, the user can be asked to repeat or restate the reply to the text message received at step 404. For example, the telematics unit 30 can be used in any suitable manner to visibly or audibly communicate a message like "Please repeat or restate your reply to the text message." Thereafter, the method loops back to step 414 to receive the user's repeated or restated reply to the text message.

At step 446, the method 400 may end in any suitable manner.

The method or parts thereof can be implemented in a computer program product including instructions carried on a computer readable medium for use by one or more processors of one or more computers to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of executing instructions corresponding to one or more steps of the disclosed method.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the invention can be applied to other fields of speech signal processing, for instance, mobile telecommunications, voice over internet protocol applications, and the like. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of automatic speech recognition, comprising the steps of:
   a) receiving a text message at a speech recognition client device;
   b) processing the text message with conversational context-specific language models and emotional context-specific language models stored on the client device using at least one processor of the client device to identify a conversational context and an emotional context corresponding to the text message;
   c) synthesizing speech from the text message;
   d) communicating the synthesized speech via a loudspeaker of the client device to a user of the client device;
   e) receiving a reply utterance in response to the text message from the user via a microphone of the client device that converts the reply utterance into a speech signal;
   f) pre-processing the speech signal using the at least one processor to extract acoustic data from the received speech signal;
   g) communicating the extracted acoustic data, the identified conversational context, and identified emotional context to a speech recognition server;
   h) identifying an acoustic model of a plurality of acoustic models stored at the server to be used for decoding the acoustic data based on the identified conversational context, the identified emotional context, or both;
   i) decoding the acoustic data using the identified acoustic model to produce a plurality of hypotheses for the reply utterance; and
   j) post-processing the plurality of hypotheses to identify one of the hypotheses as the reply utterance;
   k) presenting the identified hypothesis to the user;
   l) seeking confirmation from the user that the identified hypothesis is correct;
   m) outputting the identified hypothesis as at least part of a reply text message if the user confirms that the identified hypothesis is correct; otherwise
   n) using the emotional context to improve identification of the acoustic model, and repeating steps e) through m).

2. A method of automatic speech recognition, comprising the steps of:
   a) receiving a text message at a speech recognition client device;
   b) processing the text message with conversational context-specific language models and emotional context-specific language models stored on the client device using at least one processor of the client device to identify a conversational context and emotional context corresponding to the text message;
   c) synthesizing speech from the text message;
   d) communicating the synthesized speech via a loudspeaker of the client device to a user of the client device;
   e) receiving a reply utterance in response to the text message from the user via a microphone of the client device that converts the reply utterance into a speech signal;
   f) pre-processing the speech signal using the at least one processor to extract acoustic data from the received speech signal;
   g) identifying an acoustic model of a plurality of acoustic models to decode the acoustic data, using the identified conversational context and emotional context associated with the text message;
   h) decoding the acoustic data using the identified acoustic model to produce a plurality of hypotheses for the reply utterance;
   i) determining whether a confidence value associated with at least one of the plurality of hypotheses for the reply utterance is greater or less than a confidence threshold;
   j) communicating the extracted acoustic data, the conversational context, and the emotional context to a speech recognition server, if the confidence value is determined to be less than the confidence threshold, otherwise post-processing the plurality of hypotheses to identify one of the hypotheses as the reply utterance, and outputting from the client device the identified hypothesis as at least part of a reply text message;
   k) identifying at the server, an acoustic model of a plurality of acoustic models stored at the server to decode the acoustic data, using the identified conversational context, the emotional context, or both;
   l) decoding the acoustic data using the acoustic model identified at the server to produce a plurality of hypotheses for the reply utterance;
   m) post-processing the plurality of hypotheses to identify one of the hypotheses as the reply utterance; and
   n) outputting from the server the identified hypothesis as at least part of a reply text message.

* * * * *